United States Patent
Lando et al.

(10) Patent No.: US 7,638,890 B2
(45) Date of Patent: Dec. 29, 2009

(54) DEVICE FOR SUPPLYING ELECTRICAL POWER TO AN AIRCRAFT AND FOR ELECTRICALLY STARTING A JET ENGINE ON BOARD AN AIRCRAFT

(75) Inventors: Jean-Louis Lando, Saverdun (FR); Etienne Foch, Toulouse (FR); Xavier Roboam, Colomiers (FR); Dominique Alejo, St Gauzens (FR)

(73) Assignee: Airbus France, Toulouse (FR)

( * ) Notice: Subject to any disclaimer, the term of this patent is extended or adjusted under 35 U.S.C. 154(b) by 78 days.

(21) Appl. No.: 11/868,828

(22) Filed: Oct. 8, 2007

(65) Prior Publication Data

US 2008/0252267 A1    Oct. 16, 2008

(30) Foreign Application Priority Data

Oct. 27, 2006    (FR) .................................. 06 54588

(51) Int. Cl.
H02P 9/04 (2006.01)
F01D 15/10 (2006.01)
F02C 6/00 (2006.01)
H02K 7/18 (2006.01)
H02P 9/00 (2006.01)

(52) U.S. Cl. .................... 290/36 R; 290/52; 322/90
(58) Field of Classification Search .............. 290/36 R, 290/52; 322/90
See application file for complete search history.

(56) References Cited

U.S. PATENT DOCUMENTS

| | | | |
|---|---|---|---|
| 4,239,978 A * | 12/1980 | Kofink | 307/16 |
| 5,428,275 A * | 6/1995 | Carr et al. | 318/146 |
| 5,512,811 A * | 4/1996 | Latos et al. | 322/10 |
| 5,899,411 A * | 5/1999 | Latos et al. | 244/53 A |
| 6,266,220 B1 * | 7/2001 | Lahoud | 361/58 |
| 6,333,622 B1 | 12/2001 | Fogarty et al. | 322/90 |
| 6,351,090 B1 * | 2/2002 | Boyer et al. | 318/139 |
| 6,486,639 B1 * | 11/2002 | Montret et al. | 322/29 |
| 6,504,261 B2 * | 1/2003 | Fogarty et al. | 290/52 |
| 6,725,132 B2 * | 4/2004 | Frankel et al. | 700/300 |
| 6,801,004 B2 * | 10/2004 | Frankel et al. | 318/268 |
| 6,931,306 B2 * | 8/2005 | Frankel et al. | 700/300 |
| 6,954,684 B2 * | 10/2005 | Frankel et al. | 700/300 |
| 6,995,532 B2 * | 2/2006 | Frankel et al. | 318/400.13 |
| 7,104,072 B2 * | 9/2006 | Thompson | 60/786 |
| 7,117,054 B2 * | 10/2006 | Frankel et al. | 700/97 |
| 7,117,683 B2 * | 10/2006 | Thompson | 60/786 |
| 7,131,275 B2 * | 11/2006 | Gustafson | 60/788 |
| 7,227,271 B2 * | 6/2007 | Anghel et al. | 290/31 |
| 7,285,871 B2 * | 10/2007 | Derouineau | 290/52 |
| 7,305,316 B2 * | 12/2007 | Frankel et al. | 702/99 |

(Continued)

FOREIGN PATENT DOCUMENTS

EP    1 510 691 A2    3/2005

Primary Examiner—Nicholas Ponomarenko
Assistant Examiner—Pedro J Cuevas
(74) Attorney, Agent, or Firm—Oblon, Spivak, McClelland, Maier & Neustadt, L.L.P.

(57) ABSTRACT

This invention relates to a device for supplying electrical power to an aircraft and for electrically starting a jet engine on board an aircraft, including a multi-phased starter-generator, a multi-phased transformer-rectifier unit, a multi-phased DC-AC converter, a multi-phased rectifier unit, and at least one three-phase inverter, wherein the number of phases is equal to or greater than 5.

15 Claims, 7 Drawing Sheets

U.S. PATENT DOCUMENTS

| | | | |
|---|---|---|---|
| 7,327,113 B2 * | 2/2008 | Steigerwald et al. | 318/599 |
| 7,468,561 B2 * | 12/2008 | Kern et al. | 290/4 A |
| 7,481,062 B2 * | 1/2009 | Gaines et al. | 60/792 |
| 2003/0234624 A1 * | 12/2003 | Frankel et al. | 318/268 |
| 2003/0234625 A1 * | 12/2003 | Frankel et al. | 318/268 |
| 2003/0236594 A1 * | 12/2003 | Frankel et al. | 700/300 |
| 2004/0021437 A1 * | 2/2004 | Maslov et al. | 318/254 |
| 2004/0186629 A1 * | 9/2004 | Frankel et al. | 700/300 |
| 2005/0040779 A1 * | 2/2005 | Frankel et al. | 318/268 |
| 2005/0171648 A1 * | 8/2005 | Frankel et al. | 700/300 |
| 2005/0184689 A1 * | 8/2005 | Maslov et al. | 318/254 |
| 2006/0061336 A1 * | 3/2006 | Anghel et al. | 322/59 |

* cited by examiner

DEVICE FOR SUPPLYING ELECTRICAL POWER TO AN AIRCRAFT AND FOR ELECTRICALLY STARTING A JET ENGINE ON BOARD AN AIRCRAFT

TECHNICAL FIELD

This invention relates to a device for supplying electrical power to an aircraft and for electrically starting a jet engine on board an aircraft.

Below, in order to simplify the description, we will consider, by way of example, an airplane-type aircraft.

PRIOR ART

Most commercial airplanes include an on-board pneumatic system for starting their jet engines. An auxiliary power unit (APU) can indeed be used to produce compressed air that is routed to the pneumatic starting engines coupled to these jet engines. In each jet engine, the pressurised air serves to drive the turbine to a sufficient speed in order to enable the fuel injection and ignition. The jet engine then starts and becomes autonomous.

The term "jet engine" used above refers to both a jet engine designed to provide the thrust of the aircraft and an APU-type (auxiliary power unit) jet engine that makes it possible to supply power on board the aircraft when it is on the ground.

To provide air conditioning inside the airplane cabin, warm air is taken from the jet engine and mixed with outside air in order to reach a set point temperature. In addition, the movements of various airplane wing area surfaces are performed by means of servo controls powered by a hydraulic distribution network often pressurised by pumps driven by the jet engines.

The pneumatic starting and air conditioning system requires the installation of air conduits of large diameter leading to the fuselage, the wings, the struts and the engine nacelles of the airplane. This leads to disadvantages associated with the installation, the duration of assembly and the loss of performance of the jet engine associated with the uptake of air, which could be used for the thrust.

A solution enabling such disadvantages to be overcome consists of partially or completely replacing the pneumatic systems with systems using electrical energy. Such a solution has numerous advantages in terms of flexibility of use. Thus, if we eliminate the uptake of air on the engines (so-called "bleedless" airplane), the starting can be performed electrically by using the main electrical generators of the airplane in engine mode. The air conditioning can then be provided by the compression of air taken directly from outside of the airplane by means of electrical compressors. The various airplane wing surface areas can be moved by means of electro-hydraulic actuators (EHA), which are electrically powered (AC or DC network), and which locally produce a hydraulic pressure by the association of an electrical engine and a hydraulic pump. Such a solution therefore makes it possible to partially or completely replace the hydraulic network with an electrical network.

Figure 1:
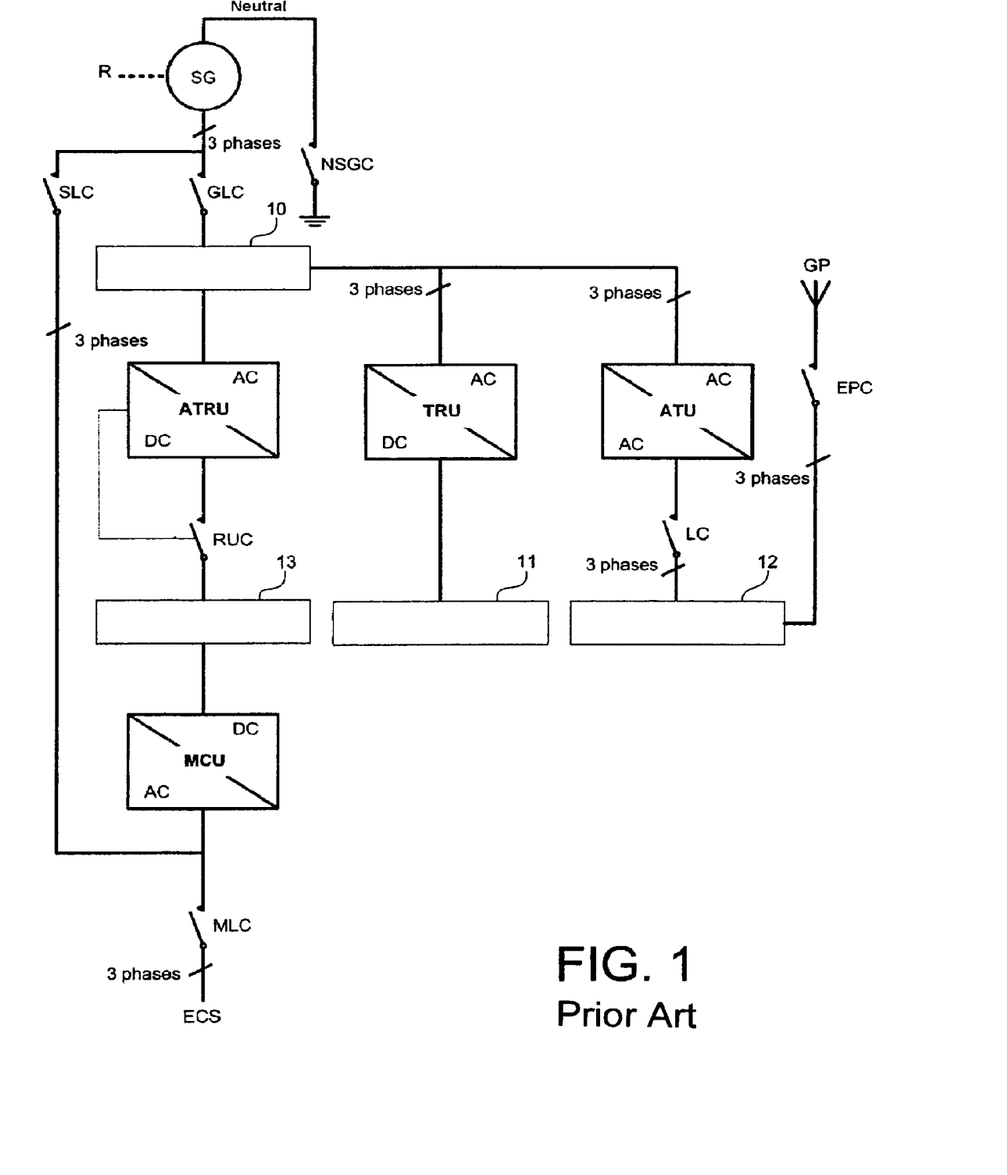
FIG. 1 shows a device of the prior art.

A "bleedless" device known from the prior art, shown in FIG. 1, includes the following elements:

- a starter-generator SG, which is a contactless 230-volt synchronous AC machine operating from 360 Hz to 900 Hz,
- an AC-AC ATU converter, which is a three-phase autotransformer unit,
- an AC-DC TRU converter, which is a three-phase transformer rectifier unit,
- a 12- or 18-pulse three-phase ATRU autotransformer rectifier unit with interphase inductances,
- a DC-AC MCU converter, which is a three-phase inverter,
- an ECS compressor motor, which is a three-phase synchronous motor with permanent magnets.

The principle of operation of this device is as follows:

In the generator mode, the jet engine R drives the starter-generator SG in rotation, which produces 230-volt AC three-phase voltages with a variable frequency between 360 Hz and 900 Hz according to the engine power on the 230-volt AC distribution bar 10. This distribution bar is powered by means of a GLC contactor. This distribution bar 10 powers the TRU and ATU converters and the ATRU auto-transformer. The TUR converter produces a direct voltage of 28 DC volts on distribution bar 11 and the ATU converter transforms the 230 AC volts into 115 AC volts on the distribution bar 12. The ATRU auto-transformer transforms the 230 AC volts into +/−270 DC volts (540 DC volts of differential voltage). The distribution bar +/−270 DC volts 13 is used by the MCU converter to control in torque and speed the ECS air compressor motor for providing air conditioning in the cabin.

In starter mode, the 115 AC volt distribution bar 12 is powered by a ground power unit GP at a fixed frequency 400 Hz and at a fixed voltage of 115 AC volts. The power-reversible ATU converter generates 230 AC volts powering the 230 AC volt distribution bar 10. This voltage is then converted into +/−270 DC volts by the ATRU auto-transformer on the distribution bar 13 in order to power the MCU converter. The MLC contactor is open, the SLC contactor is closed and the GLC contactor is open. The NSGC contactor (neutral) is open so as to prevent the common mode currents from developing and adversely affecting the thermal behaviour of the assembly. The SG generator is therefore powered by currents coming from the MCU converter, causing it to operate in engine mode so as to transmit the mechanical power to the jet engine R in order to ensure that it starts. The choice of high voltages, 230 AC volts and +/−270 DC volts, makes it possible, for a given power, to reduce the cross-section of the electrical cables so as to reduce their mass.

Such a device has the following disadvantages:
- the three-phase TRU and ATU converters and ATRU auto-transformer operating at 360 Hz to 800 Hz are constituted by relatively heavy magnetic circuits;
- the ATRU auto-transformer and the TRU converter have a complex 12- or 18-phase rectifying topology after converting three-phase voltages into 360 Hz to 800 Hz, using interphase inductances. They are therefore difficult to produce;
- the quality of the voltage on the 115 AC volt network is difficult to control insofar as the voltage is regulated upstream on the 230 volt AC distribution bar 10, and the ATU converter introduces voltage drops dependent on load, which cannot be compensated;
- in general, the starter-generator SG and all of the other elements of this device are relatively heavy, which presents a problem in the aeronautical field.

This invention is intended to overcome these various disadvantages by proposing a device for electrically starting a jet engine on board an aircraft that is lightweight and simplified.

DESCRIPTION OF THE INVENTION

The invention relates to a device for supplying electrical power to an aircraft and for electrically starting a jet engine on board an aircraft, for example an airplane, including a multi-phased starter-generator, a multi-phased transformer-rectifier, a multi-phased DC-AC converter, characterised in that it includes, in addition, a multi-phased rectifier, and at least one three-phase inverter, and in that the number of phases of the multi-phased starter-generator, the multi-phased transformer-rectifier, the multi-phased DC-AC converter, and the multi-phased rectifier is equal to or greater than 5.

The starter-generator advantageously generates a frequency between 800 Hz and 2 KHz.

The starter-generator advantageously includes a five-phase stator that comprises five phases dephased by 72° for two consecutive phases.

The device of the invention advantageously includes split power lines. The power lines do not comprise a neutral cable.

The multi-phased rectifier advantageously includes ten diodes.

The transformer-rectifier advantageously includes primary and secondary five-phase windings and ten diodes mounted on a full-wave rectifier.

The transformer-rectifier advantageously includes an output filter.

The DC-AC converter is advantageously a five-phase power-reversible inverter that can operate as a voltage inverter and rectifier.

Advantageously each three-phase inverter is a power and filtering inverter module.

The device of the invention has the following advantages:

the increase in the number of poles and the number of phases (five phases instead of three) of the starter-generator with respect to a starter-generator of the prior art makes it possible to increase the mean torque and reduce the torque ripple. The increase in frequency allows for an improvement in the mass;

the fact of not distributing the AC voltage makes it possible to eliminate the neutral cable and therefore to reduce the mass. By eliminating this cable, the common mode currents are non-existent, which makes it possible to reduce the thermal constraints on the starter-generator and on the DC-AC converter. The quality of the voltage (harmonic distortion) is also improved. The masses of the three-phase and five-phase power supply lines ("feeders") can, under certain conditions, be equivalent: two cables per phase with three phases, one cable per phase with five phases;

the generation of five-phase AC voltages of high frequency makes it possible to use a simple ten-diode rectifier without a magnetic circuit and without interphase inductance for a significant improvement in mass (for example with a ratio 5), with significantly greater reliability and efficiency than the devices of the prior art. The quality of the rectified voltage is improved. The topology and production are simpler. The size of the filters is reduced.

The use of a five-phase transformer-rectifier at high frequency makes it possible to reduce the mass thereof while increasing the quality of the rectified voltage. The topology and the production are simpler. The size of the filters is reduced.

The use of a power-reversible DC-AC converter (possibly operating as a rectifier) enables this equipment to be reciprocal in order to electrically start the jet engine when it is associated with a second converter operating as an inverter. Under these conditions, the auto-transformer of the device of the prior art shown in FIG. 1 can be eliminated, which allows for an improvement in the mass. In a use on a three-phase ground power unit, only three phases among five are used in the operation as a rectifier.

The use of a family of 115-volt AC one- or three-phase inverters at a fixed frequency 400 Hz allows for great flexibility at the level of the network. It is simply necessary to add an inverter module each time a standard load is to be added. The constraints on the quality of the voltage are implemented on the inverter module instead of being imposed upstream on the main network. This makes it possible to reduce or replace the heavy and voluminous filters of the main network (variable frequency, sum of constraints) by lighter filters (fixed frequency, individual constrains) at the level of the inverter modules.

The device of the invention can be used in the general case of multi-phased networks (number of phases greater than or equal to five). However, the improvement in the torque ripple in engine mode requires a prime number of phases. Similarly, the elimination of the interphase inductances of the rectifiers requires an uneven number of phases.

DETAILED DESCRIPTION OF SPECIFIC EMBODIMENTS

Figure 2:
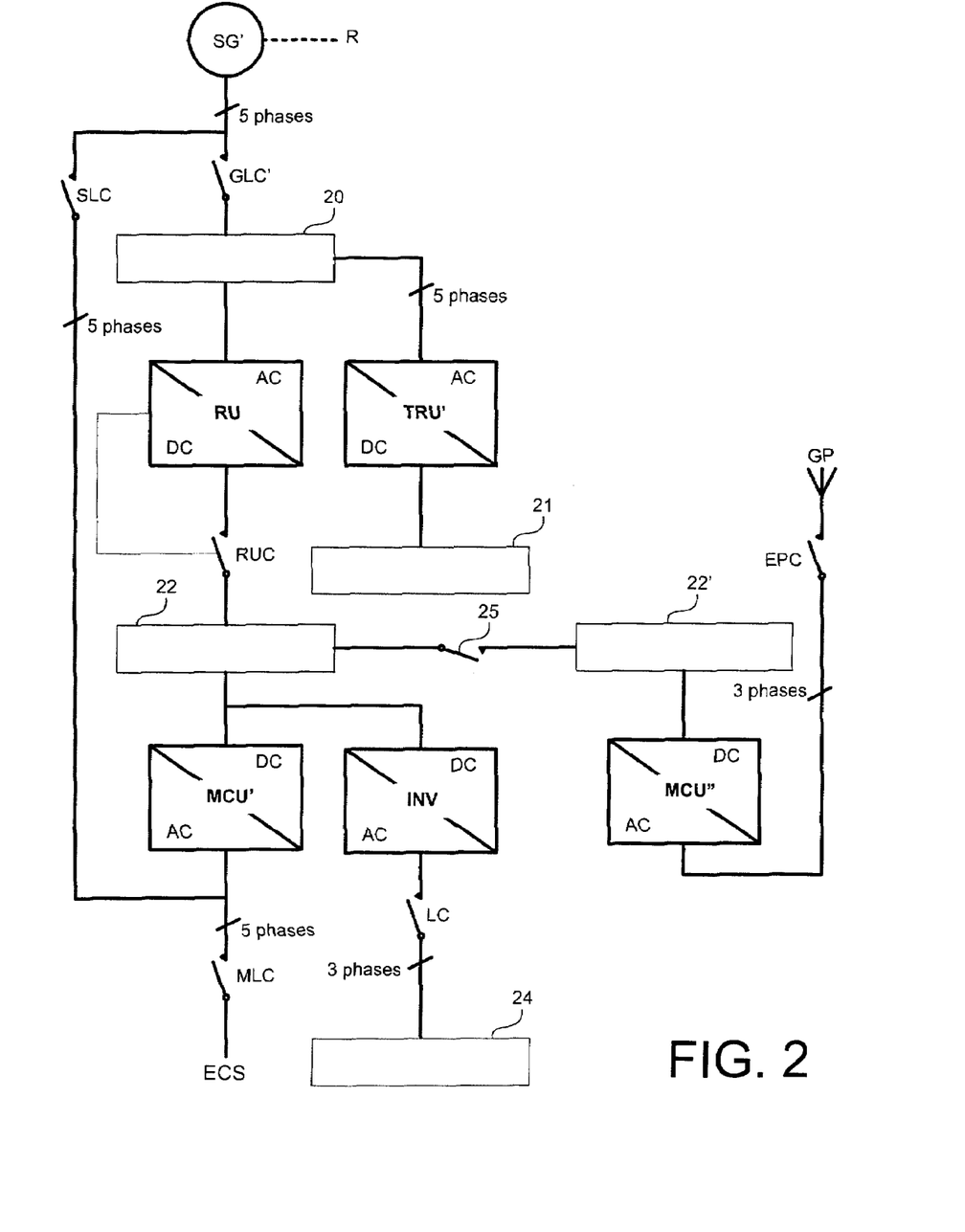
FIGS. 2, 3 and 4 respectively show the device according to the invention, a mode of operation thereof as an electrical generator, and a mode of operation thereof as an electrical starter.

The device of the invention, shown in FIG. 2, includes the following elements:

a five-phase starter-generator SG' generating a high frequency between 800 Hz and 2 KHz, a five-phase rectifier unit RU, a five-phase transformer rectifier unit TRU', a five-phase power-reversible converter MCU' that can operate as an inverter and as a voltage rectifier, a three-phase inverter INV.

Figure 3:
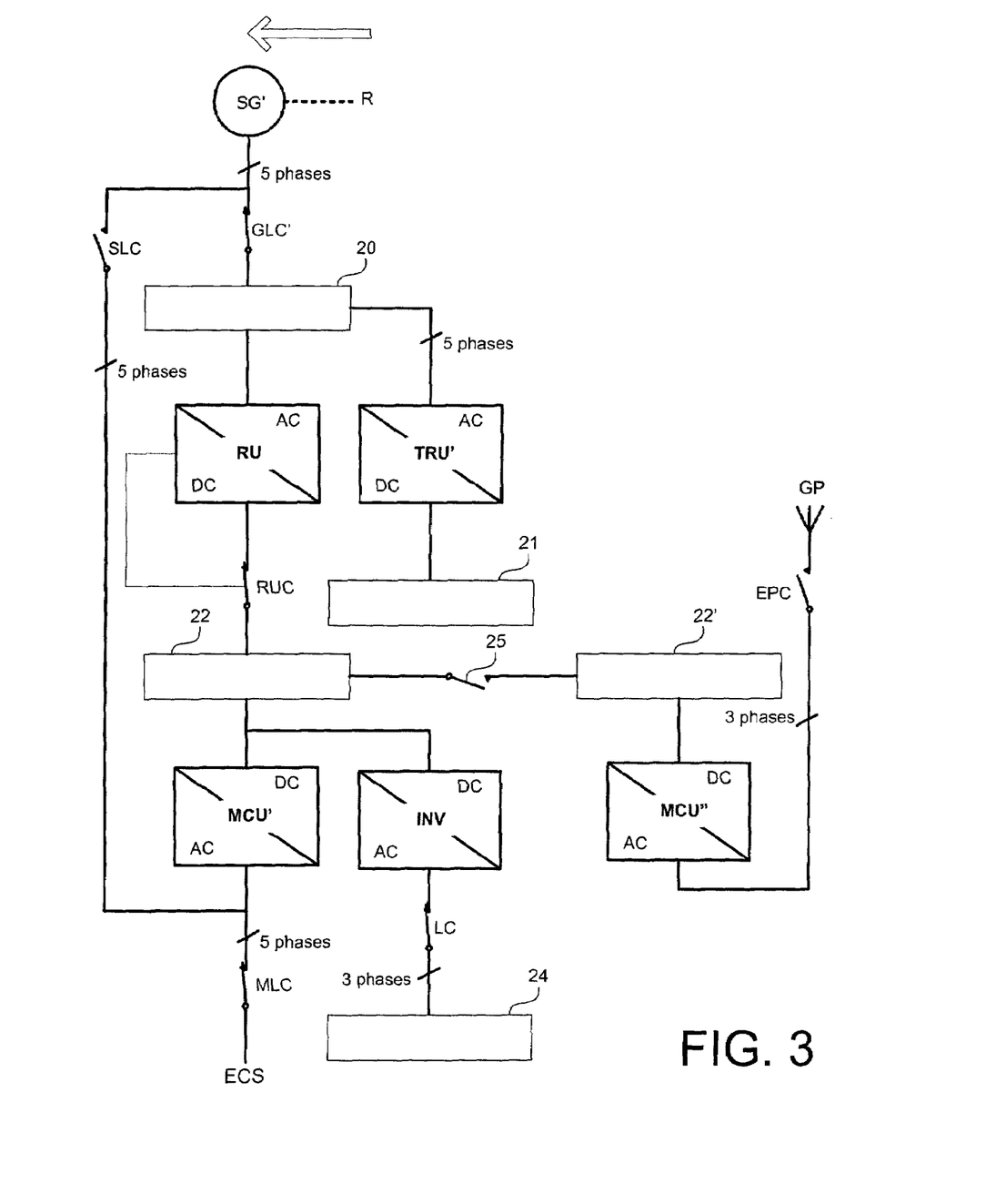

In generator mode, as shown in FIG. 3, the starter-generator SG' powers a five-phase 230-volt AC distribution bar 20 a frequencies higher than the standard frequency range (for example between 800 Hz and 2 KHz) by means of a GLC' contactor. This distribution bar 20 powers the rectifier unit RU and the transformer-rectifier unit TRU'. This transformer-rectifier unit TRU' generates a rectified DC voltage of 28 DC volts on a distribution bus 21. The rectifier unit RU generates a rectified voltage of +/−300 DC volts on a distribution bus 22. The converter MCU' is powered from the +/−300 DC volts (600 DC volts of differential voltage) of this distribution bus 22 in order to recreate AC voltages used to power the compressor ECS and also to power the three-phase inverter INV that generates 115 AC volts −400 Hz on a distribution bus 24 used by the standard loads.

Figure 4:
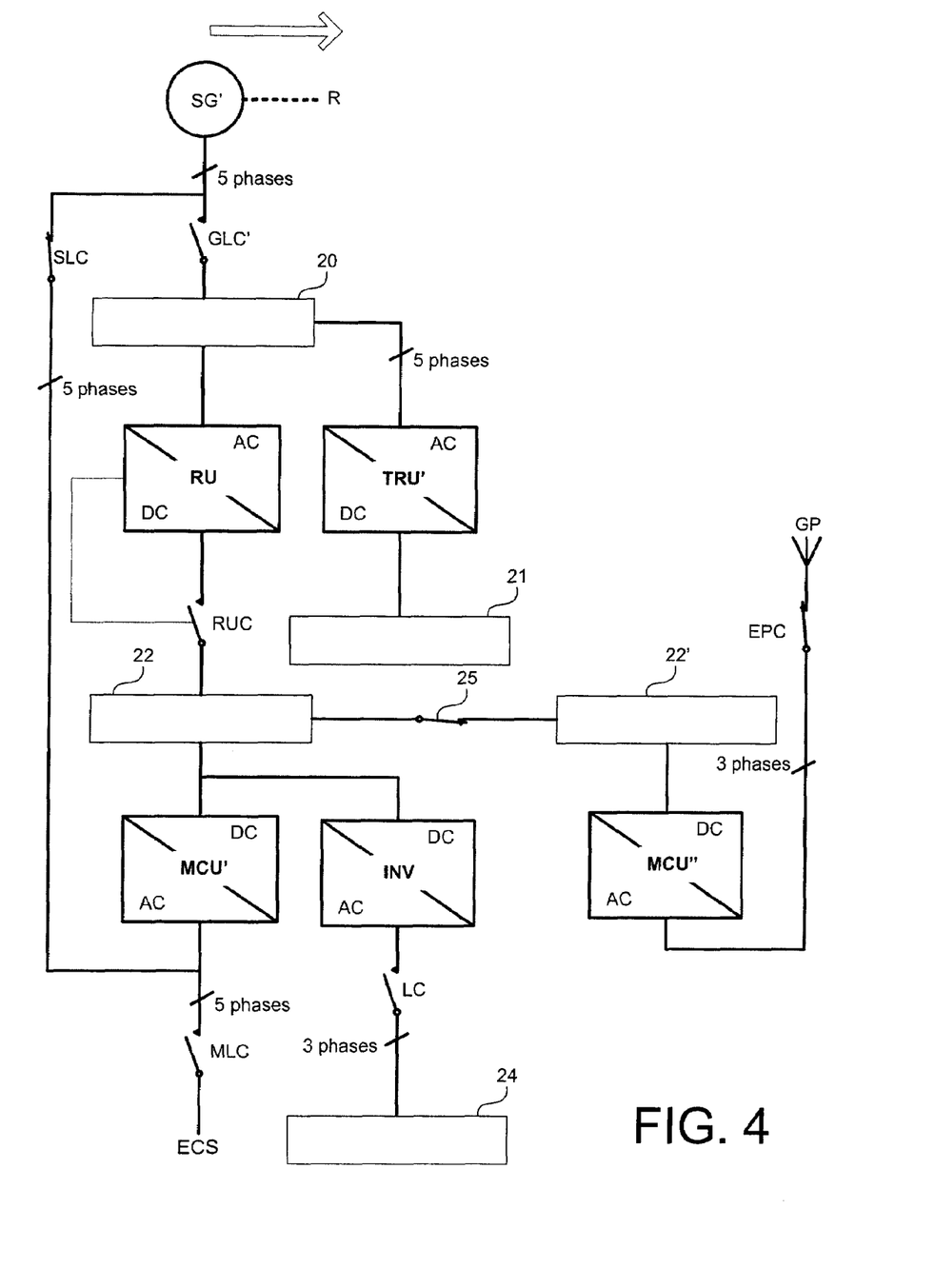

In engine starting mode, as shown in FIG. 4, the ground power unit GP is connected to the output of a converter MCU" of a channel adjacent to that of the converter MCU' by means of an EPC contactor. These converters MCU' and MCU" are power-reversible (possibly operating as rectifiers) and only three of their five phases are used to recreate a DC voltage that can be between +/−135 DC volts and +/−300 DC volts. The DC voltage at the output of the converter MCU" is connected to the other inverter MCU' by means of a transfer contactor 25 between the distribution bars 22 and 22'. The converter MCU' powers the starter-generator SG' in five-phase mode through the contactor SLC, with the contactor MLC being open so as to ensure that the jet engine R starts.

We will now more specifically analyse each of the characteristic elements of the device of the invention.

The Five-Phase Starter-Generator SG'

The starter-generator SG' that produces the electrical energy has a construction very similar to the three-phase starter-generator shown in FIG. 1, with the exception of its main stator, which has five phases instead of three phases. In a three-phase starter-generator, the electromotor forces generated are dephased in time by 120° (dephasing between two consecutive phases). In the starter-generator of the invention SG', the main stator comprises five phases instead of three, which are dephased by 72° for two consecutive phases. In addition, this starter-generator SG' has a greater number of pairs of poles than the three-phase starter-generator, which makes it possible to generate electromotor forces with a higher frequency for a given rotation speed on the mechanical shaft.

In engine operation, the torque ripple frequency in five-phase mode goes to 10 times the power supply frequency, compared with only 6 times in three-phase mode. The increase in the number of poles and the number of phases allows for a significant improvement in the mean torque. The frequencies of operation of the device of the invention are in the range of 800 Hz to 2 KHz, which allows for a significant improvement in the mass while maintaining a good compromise between the mass of the starter-generator SG' and the increase in the ferromagnetic losses caused by the increase in frequency. However, the use of higher frequencies (greater than 2 KHz) and a higher number of phases (greater than 5) is possible.

The Power Lines

Given the power generated by the starter-generator SG' (in generator mode) in order to supply power to the air conditioning engine-compressor ECS and the electrical network, the power lines ("feeders") can be "split" so as to preserve a current density in the cables compatible with their thermal limit.

In the device of the invention, insofar as the power is distributed over five phases instead of three, the power lines can be "split" only starting at a certain power limit, which makes it possible to spare a cable. Given that the cable gauges (various cable cross-sections) can be chosen only by "discrete values" in pre-established tables, the five-phase power lines can have a mass similar to that of the three-phase power lines.

In a comparative example, for a length of 25 metres, with a voltage of 230 AC volts, a power of 180 AC kilovolts at an ambient temperature of 100° C., it is possible to use:
- three-phase aluminium AD3 lines, with a total mass of 14.1 kg, or
- five-phase aluminium AD2 lines, with a total mass of 14.6 kg.

The device of the invention assumes that no unbalanced or one-phase load is connected to the 230 AC volt network. Consequently, the neutral cable can be eliminated, and the common mode currents do not exist, which allows for a significant improvement in mass in an airplane in the carbon structure where the neutral cable is supposed to connect the starter-generator to the electrical core with significant distances. Similarly, thermal constraints in the starter-generator SG' and the various converters associated with the presence of a homopolar current disappear. In the case of the example cited above, the reduction in mass due to the elimination of the neutral cable is greater than 4 kg.

The Five-phase Rectifier Unit RU

Figure 5:
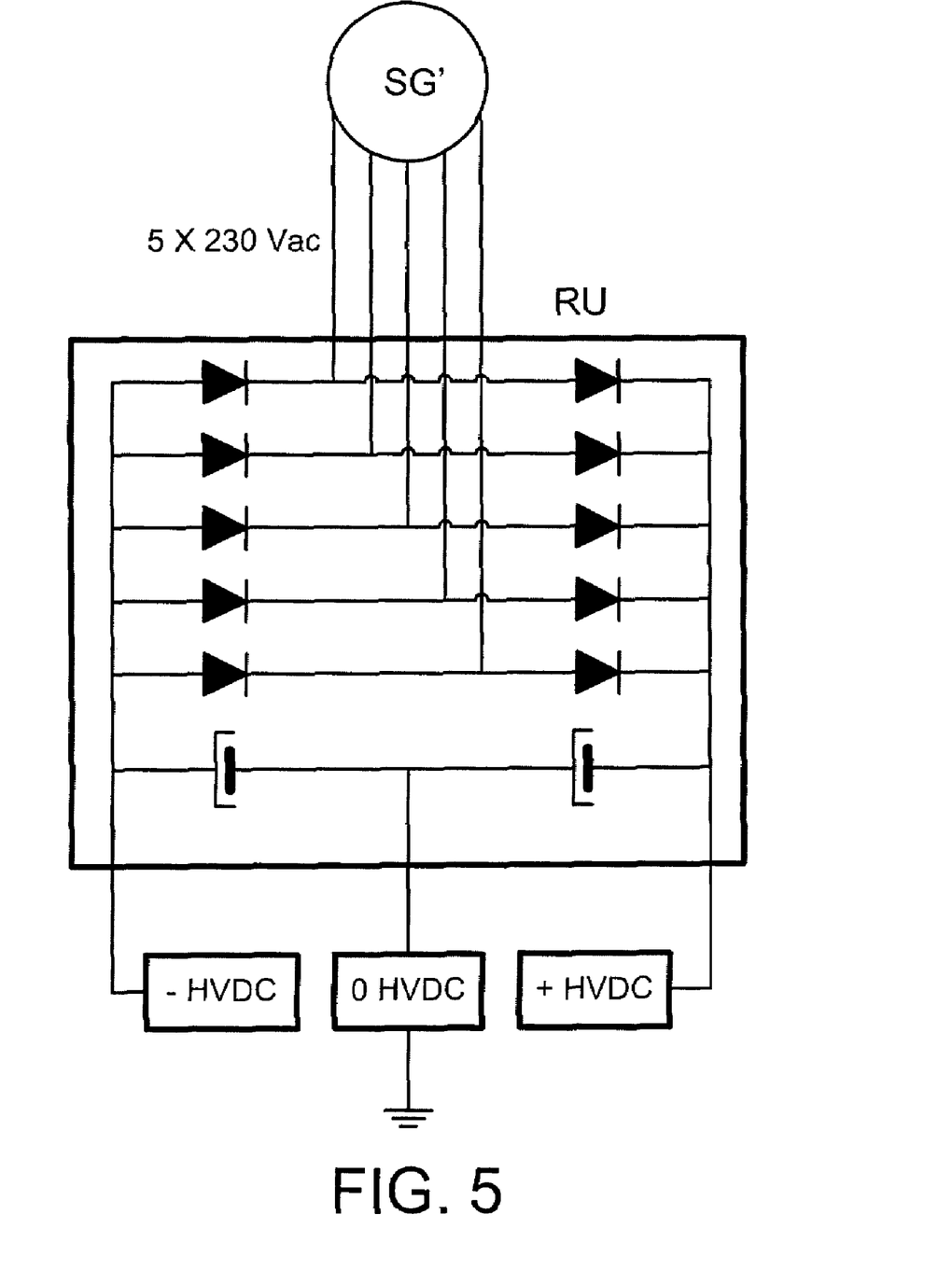
FIG. 5 shows an example of a five-phase rectifier.

The five-phase rectifier unit RU includes ten diodes assembled two-by-two in series between two DV voltages −HVDC and +HVDC, as shown in FIG. 5, with their midpoints being connected to the five outputs of the starter-generator SG'. It does not comprise a transformer or an interphase inductance, which allows for very significant improvements in mass.

In a comparative example, it is possible to use:
- a pulse auto-transformer ATRU 18, 120 KW, as shown in FIG. 1 with a mass of around 60 kg, with liquid cooling, or
- an 800 Hz −2 KHz pulse rectifier unit RU 10, as shown in FIGS. 2 and 5, 120 KW, with a mass of 10 to 15 kg, with cooling by forced air.

Figure 6A:
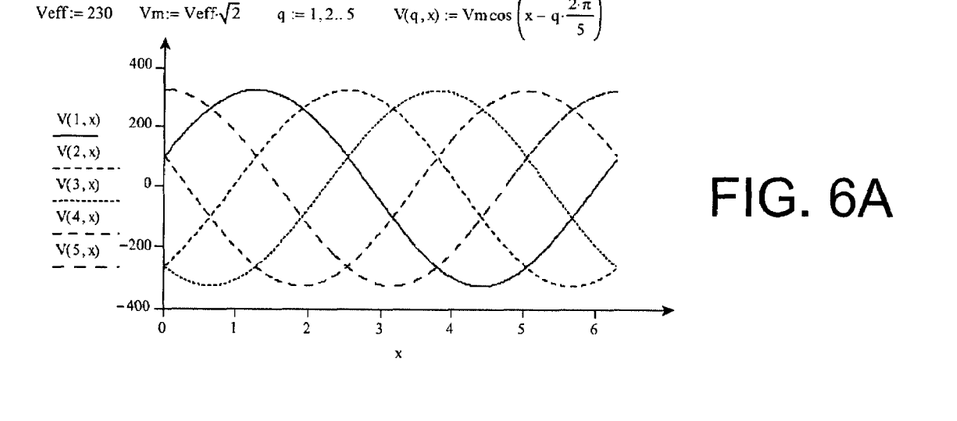
FIGS. 6A, 6B and 6C show a ten-pulse five-phase network.
Figure 6B:
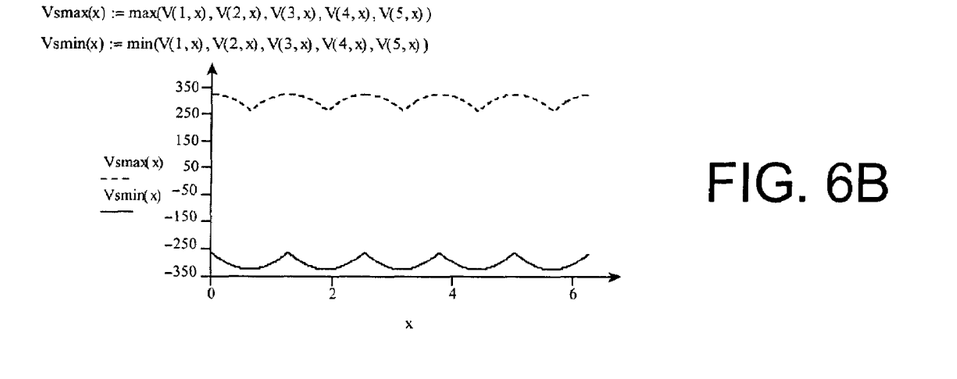
Figure 6C:
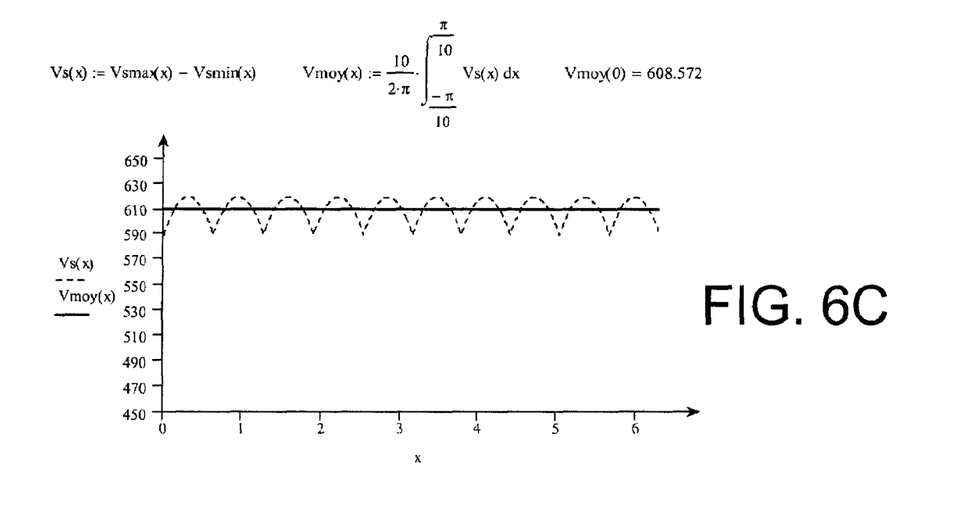

The mean value of the rectified five-phase voltage is around +/−300 DC volts, i.e. 600 DC volts of differential voltage, by comparison with +/−270 DC volts, i.e. 540 DC volts of differential voltage in three phases, as shown in FIGS. 6A to 6C.

The curves of FIG. 6A are the five sinusoids produced by a five-phase source: these are the voltages dephased by 72°. In the curves of FIG. 6B, Vsmax and Vsmin correspond to the rectified voltages at the output of the rectifier unit RU with respect to the airplane mass (neutral of the machine). In the curves of FIG. 6C, Vs is the differential voltage at the output of the rectifier unit RU: Vs=Vsmax−Vsmin between the terminals (+) and (−) of this rectifier.

This presents an advantage in terms of mass on the sizing of the cables of the DC network, which are defined with smaller gauges in consideration of the reduction in intensity associated with the increase in the mean voltage.

In terms of the quality of the rectified voltage, the rectifier unit RU makes it possible to obtain better results on the residual voltage ripple because it operates at a minimum frequency of 800 Hz. Indeed, it generates a rectified voltage comprising ten pulses per period of 1.25 ms, which is to be compared with the 18 pulses per period of 2.8 ms of an ATRU converter at 360 Hz. The size of the associated filters can be slightly reduced.

The Five-Phase Transformer-rectifier Unit TRU'

Figure 7:
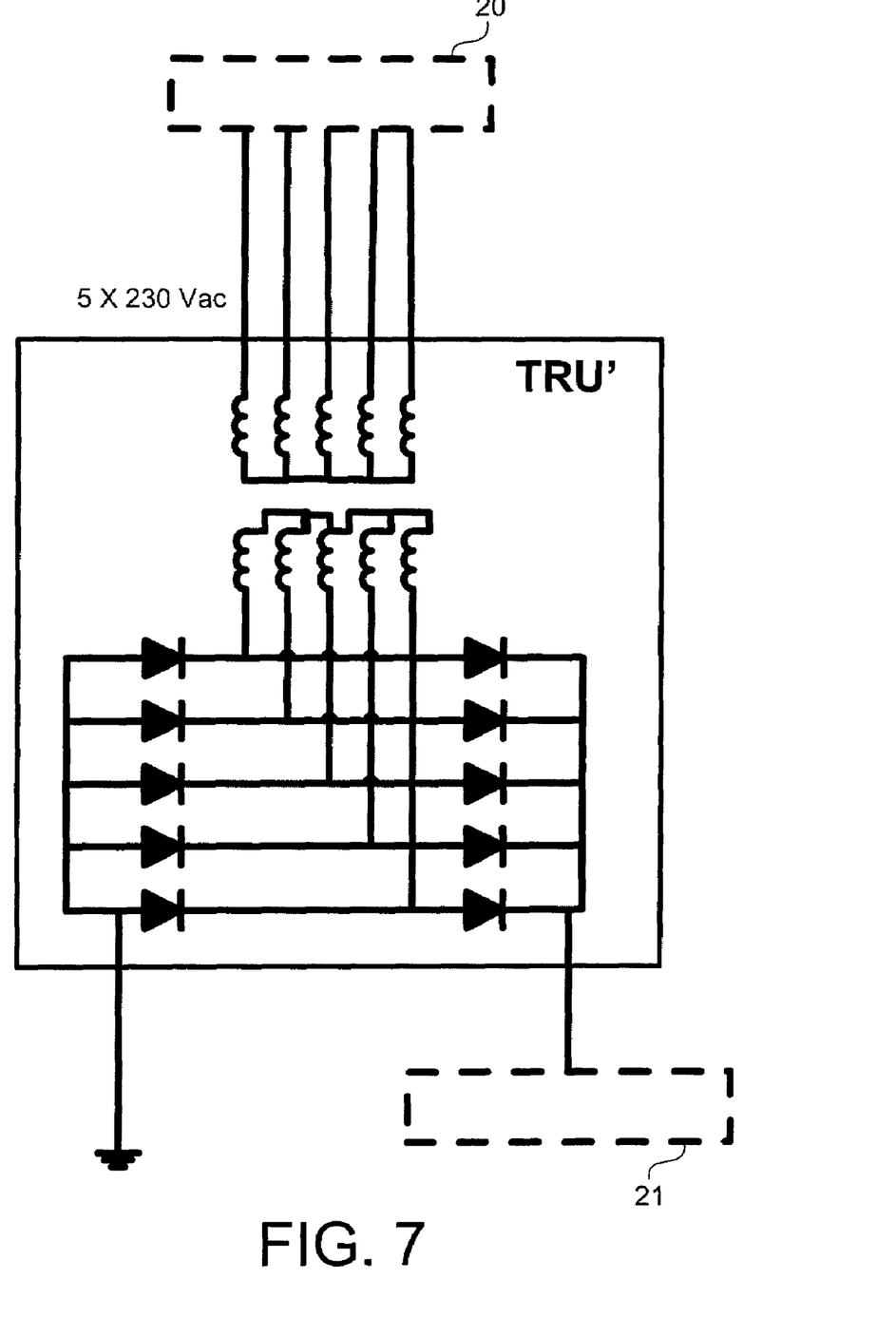
FIG. 7 shows an example of a five-phase transformer-rectifier.

The transformer-rectifier unit TRU', as shown in FIG. 8, is a transformer-rectifier constituted by primary and secondary five-phase windings and ten diodes mounted on a "full wave" rectifier. Such a transformer-rectifier has advantages in terms of simplicity of production. Indeed, it no longer requires the use of interphase inductances and complex secondary windings. In addition, the increase in frequency makes it possible to significantly reduce the size and therefore the mass of the magnetic circuit. Similarly, for the same reasons as those mentioned above for the rectifier unit RU, the performance in terms of the residual ripple are better than for a 12- or 18-pulse transformer-rectifier unit TRU at 360 Hz. The addition of an output filter, not shown in FIG. 7, makes it possible to even further reduce the residual ripple.

The Power-reversible Converter MCU'

The converter MCU' is a five-phase power-reversible voltage inverter: two modes of operation are possible, the inverter mode and the rectifier mode. In an inverter operation, the converter MCU' is used either to power the compressor engine ECS used to provide air conditioning in the cabin, or to power the starter-generator SG' in engine mode in order to electrically start the jet engine R. In rectifier mode, the converter MCU' can be used to generate a DC voltage, which is then used by another inverter MCU" in inverter mode. This makes it possible for the same equipment to be reciprocal and, therefore to see an improvement in mass associated with the elimination of the ATU converter (conversion of 230 AC volts/115 AC volts) shown in FIG. 1, using a magnetic circuit adversely affecting the mass.

The Inverter for the 115 AC Volt Network INV

The conventional 115 AC volt electrical network is created from one or more power inverter INV and filtering modules adapted as needed or to the load that it powers. Such a solution makes it possible to provide a fixed frequency at the inverter output in order to power conventional loads such as asynchronous motors, furnaces or any other type of one-phase or three-phase equipment. It also allows for great flexibility because it is simply necessary to add an inverter module each time it is necessary, without being concerned about the network quality on the main 230 AC volt network at variable frequency or the +/−300 volt DC network. Thus, a family of inverter modules can be developed with a full range of powers as needed.

The invention claimed is:

1. A device for supplying electrical power to an aircraft and for electrically starting a jet engine on board an aircraft, including a multi-phased starter-generator, a multi-phased transformer-rectifier unit, a multi-phased DC-AC converter, a multi-phased rectifier unit, and at least one three-phase inverter, wherein the number of phases of the multi-phased starter-generator, the multi-phased transformer-rectifier, the multi-phased DC-AC converter, and the multi-phased rectifier is equal to or greater than 5,
   wherein the DC-AC converter is a five-phase power-reversible inverter that can operate as a voltage inverter and rectifier.

2. A device according to claim 1, wherein the starter generator generates a frequency between 800 Hz and 2 KHz.

3. A device according to claim 1, wherein the starter-generator includes a five-phase stator that comprises five phases dephased by 72° for two consecutive phases.

4. A device according to claim 1, including split power lines.

5. A device according to claim 3, wherein the power lines do not comprise a neutral cable.

6. A device according to claim 1, wherein the multi-phased rectifier unit includes ten diodes.

7. A device according to claim 1, wherein the transformer-rectifier unit includes primary and secondary five-phase windings and ten diodes mounted on a full-wave rectifier.

8. A device according to claim 6, wherein the transformer-rectifier unit includes an output filter.

9. A device according to claim 1, wherein each three-phase inverter is a power inverter and filtering module.

10. A device according to claim 1, wherein the aircraft is an airplane.

11. An aircraft comprising a device of claim 10.

12. A device for supplying electrical power to an aircraft and for electrically starting a jet engine on board an aircraft, said device comprising:
   a multiphase AC distribution bar,
   an AC distribution bus,
   a first DC distribution bar,
   a second DC distribution bar connected to the first DC distribution bar through a transfer contactor,
   a DC distribution bus,
   a multiphase starter-generator whose outputs are connected to the multiphase AC distribution bar through a contactor,
   a multiphase rectifier unit whose inputs are connected to the multiphase AC distribution bar and whose outputs are connected to the second DC distribution bar,
   a multiphase power-reversible converter connected on one side to the first DC distribution bar and on the other side to a compressor engine through a contactor,
   a three-phase inverter connected on one side to the first DC distribution bar and on the other side to the AC distribution bus through a contactor,
   wherein the number of phases of the multiphase starter-generator, the multiphase rectifier unit the multiphase transformer-rectifier unit, and the multiphase power-reversible converter, is equal to or greater than 5.

13. A device according to claim 12, further comprising a second multiphase converter connected on one side to the second DC distribution bars and eventually on the other side to a ground power unit through a contactor.

14. A device according to claim 12, wherein the multiphase starter-generator generates a frequency between 800 Hz and 2 KHz.

15. A device according to claim 12, wherein the multiphase starter-generator includes a five-phase stator that comprises five phases dephased by 72° for two consecutive phases.

* * * * *